(12) United States Patent
Wimberly

(10) Patent No.: US 7,563,980 B2
(45) Date of Patent: Jul. 21, 2009

(54) OUTLET COVER WITH BARRIER WALL

(76) Inventor: Joseph W. Wimberly, 39 S. Glenview, Lombard, IL (US) 60148

( * ) Notice: Subject to any disclaimer, the term of this patent is extended or adjusted under 35 U.S.C. 154(b) by 0 days.

(21) Appl. No.: 12/184,923

(22) Filed: Aug. 1, 2008

(65) Prior Publication Data

US 2008/0289846 A1    Nov. 27, 2008

Related U.S. Application Data

(63) Continuation-in-part of application No. 11/670,872, filed on Feb. 2, 2007, now Pat. No. 7,408,112.

(51) Int. Cl.
*H02G 3/14* (2006.01)
(52) U.S. Cl. .............. 174/66; 174/58; 174/67; 29/854; 362/147; 220/477
(58) Field of Classification Search .......... 174/66, 174/67, 58, 503, 481; 220/241, 242, 477; 403/349; 29/854; 362/147, 418, 370; 52/28
See application file for complete search history.

(56) References Cited

U.S. PATENT DOCUMENTS

| | | | |
|---|---|---|---|
| 4,327,841 A | 5/1982 | Wimberly | |
| 5,133,165 A | 7/1992 | Wimberly | |
| 5,326,060 A | 7/1994 | Chubb et al. | |
| 5,598,670 A | 2/1997 | Humphrey et al. | |
| 5,722,208 A | 3/1998 | Humphrey et al. | |
| 6,112,927 A * | 9/2000 | Gretz | 220/3.7 |
| RE38,881 E | 11/2005 | Chubb et al. | |
| 7,117,591 B1 | 10/2006 | Gretz | |
| 7,408,111 B2 * | 8/2008 | Clark et al. | 174/66 |
| 7,425,677 B2 * | 9/2008 | Gates et al. | 174/50 |
| 7,427,714 B1 * | 9/2008 | Lammens et al. | 174/66 |
| 7,468,486 B2 * | 12/2008 | Yan | 174/58 |

* cited by examiner

*Primary Examiner*—Dhiru R Patel
(74) *Attorney, Agent, or Firm*—Cardinal Law Group

(57) ABSTRACT

An outlet cover with barrier wall, the cover for an outlet box mounted in a building wall including an outer wall with an outer opening; a surrounding wall integrally joined to and extending substantially normal to the outer wall; an L-shaped barrier wall integrally joined to and extending substantially normal to the outer wall, the barrier wall forming an inner opening opposite the outer opening to meet the outlet box, a portion of the barrier wall extending toward the plane of the inner opening, the barrier wall further forming a cover conduit port; an attaching flange integrally joined to the surrounding wall for being placed against the building wall, the attaching flange being a continuous flange about the surrounding wall; a display enclosure forming an interior and an enclosure conduit port; and a conduit having a conduit passage in communication between the cover conduit port and the enclosure conduit port.

11 Claims, 6 Drawing Sheets

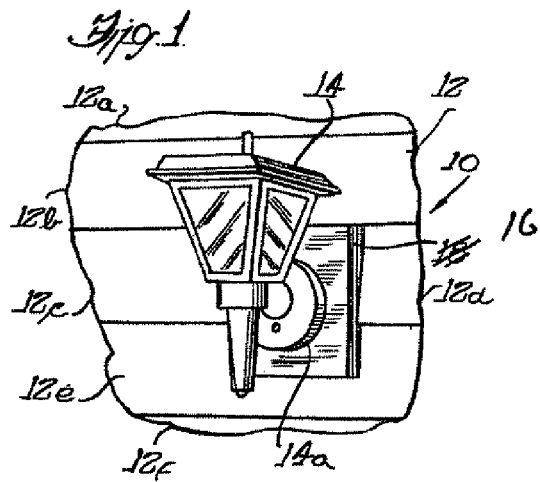
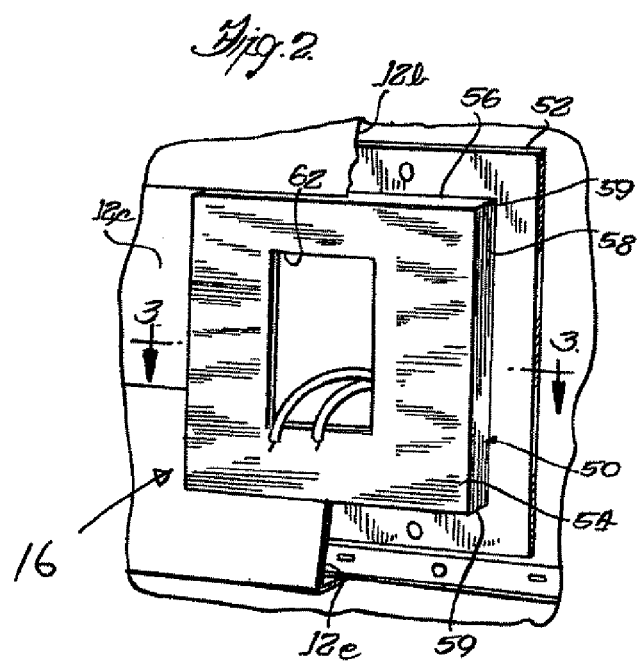
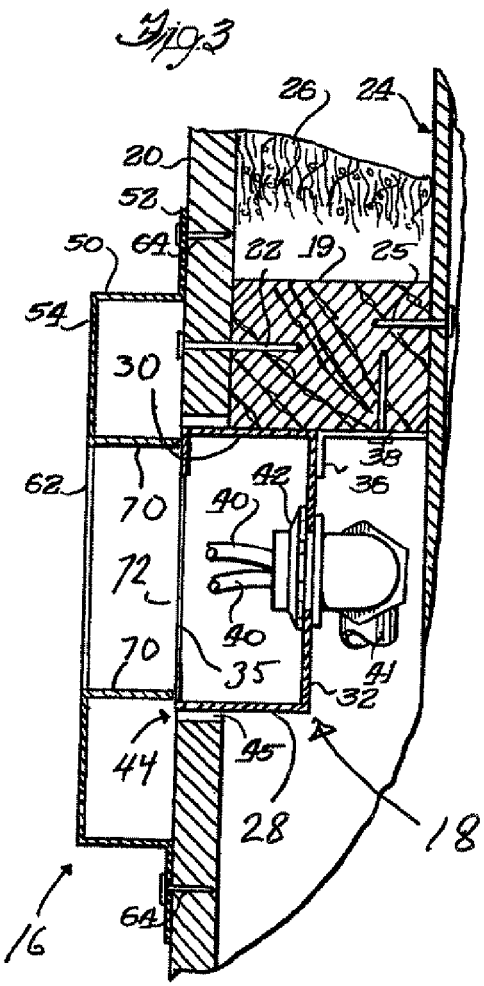
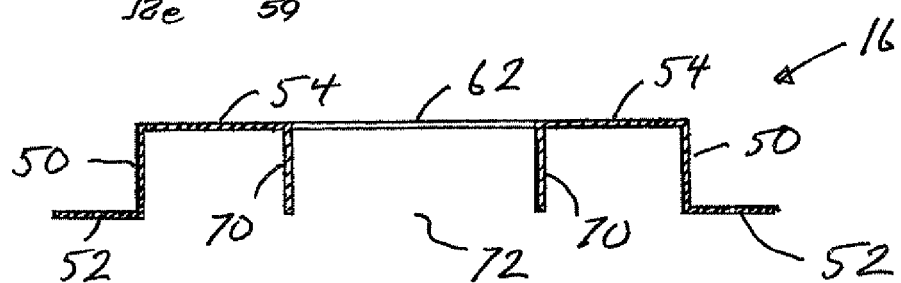

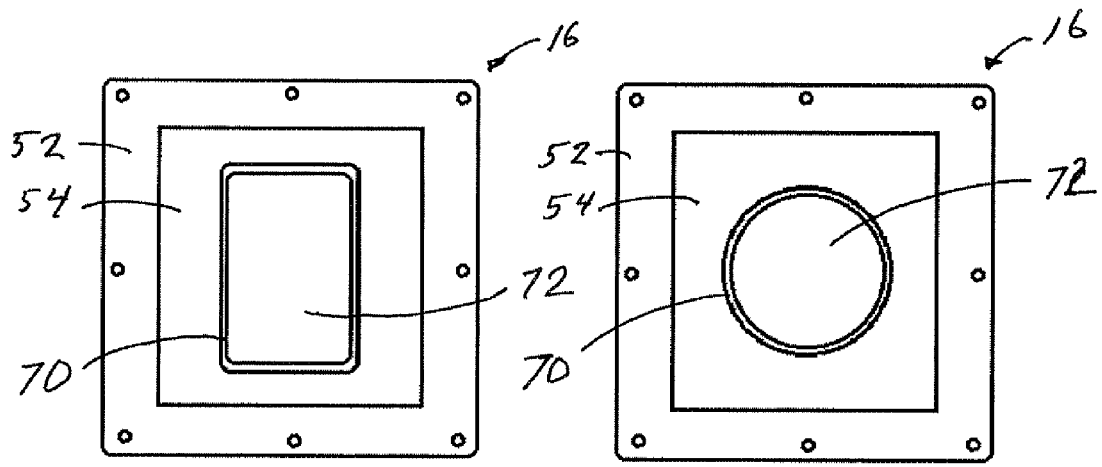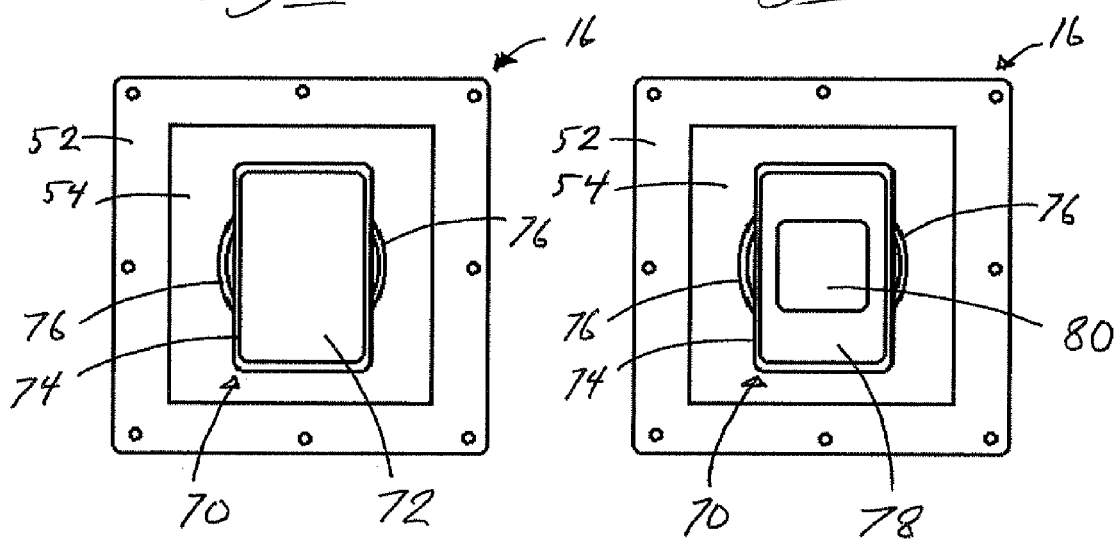

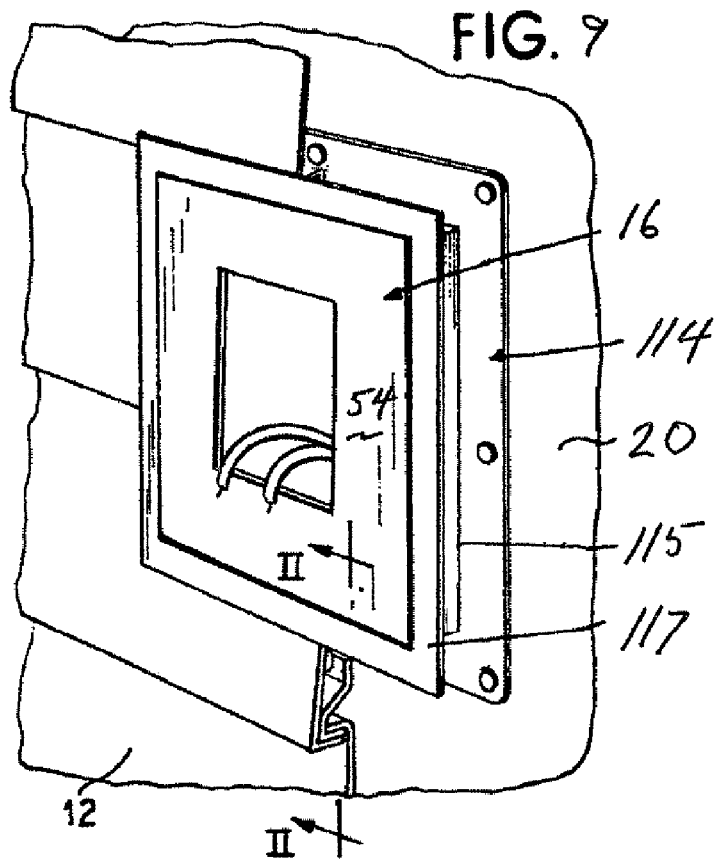
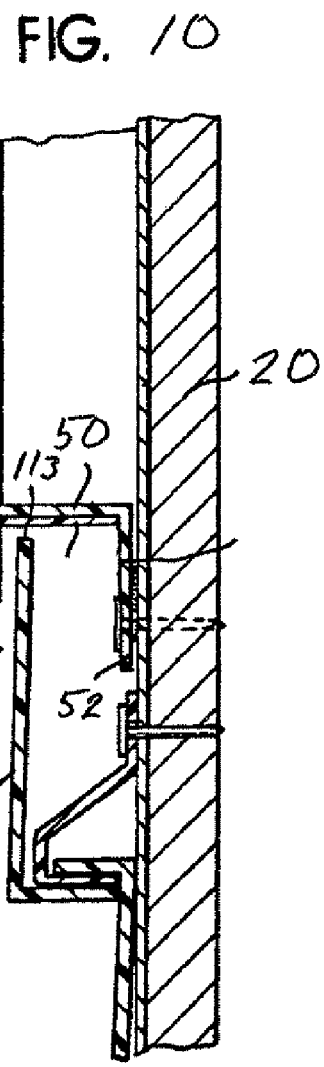
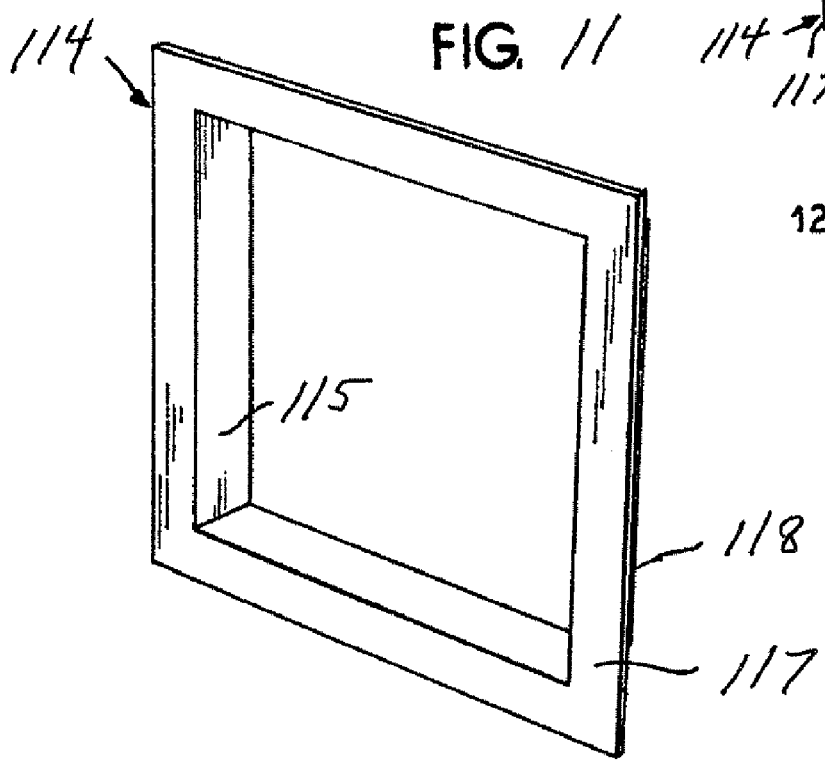

OUTLET COVER WITH BARRIER WALL

CROSS REFERENCE TO RELATED APPLICATION

This application is a continuation-in-part of and claims priority from U.S. patent application Ser. No. 11/670,872, filed Feb. 2, 2007, now U.S. Pat. No. 7,408,112 incorporated herein in its entirety by reference.

BACKGROUND OF THE INVENTION

This invention relates generally to outlet covers, and more specifically to outlet covers with a barrier wall.

Electric outlet boxes are provided in buildings to permit connection of decorative light fixtures and exterior outlets on the outside of the buildings. The outlet boxes are often installed in the building wall before siding or other exterior covering is installed. The electrician typically installs the outlet box with its outer edge flush with the building wall and the decorative light fixture is installed later, usually after the siding has been installed. An outlet cover is required to make the transition between the decorative light fixture and the outlet box and to seal around the outlet box.

The present designs of outlet covers fail to solve a number of problems. The outlet cover must provide a weather seal around the outlet box to avoid water leakage into the building and energy loss from the building. The outlet cover must provide electrical isolation for the wiring passing through the outlet box to the decorative light fixture or exterior outlet, so that a spark or hot wire is contained. The outlet cover must be suitable for the shape of the outlet box, i.e., the outlet cover must be tailored for or suitable for use with rectangular or round outlet boxes. The outlet cover must provide a secure platform for mounting the decorative light fixture or exterior outlet, so that the decorative light fixture or exterior outlet does not shift or twist.

In addition, the present designs of outlet covers fail to provide an area for display of information. Under normal conditions, visitors and delivery persons need to know address numbers. Under emergency conditions, neighbors need to know of the emergency so they can call the fire department, police department, or other agency for help. Without information, the occupants and the neighbors are at risk.

It would be desirable to have an outlet cover with a barrier wall that overcomes the above disadvantages.

SUMMARY OF THE INVENTION

One aspect of the invention provides a cover for an outlet box mounted in a building wall, including an outer wall with an outer opening formed in the outer wall; a surrounding wall integrally joined to an outer periphery of the outer wall and extending substantially normal to the outer wall; an L-shaped barrier wall integrally joined to an inner periphery of the outer wall at an edge of the outer opening and extending substantially normal to the outer wall, the barrier wall forming an inner opening opposite the outer opening to meet the outlet box, a portion of the barrier wall extending toward the plane of the inner opening, the barrier wall further forming a cover conduit port; an attaching flange integrally joined to an inner end of the surrounding wall for being placed against the building wall, the attaching flange being a continuous flange about an exterior periphery of the surrounding wall; a display enclosure forming an interior and an enclosure conduit port; and a conduit having a conduit passage in communication between the cover conduit port and the enclosure conduit port.

Another aspect of the invention provides a system of an outlet box mounted in a building wall, the outlet box having a front opening and the building wall being covered with siding, including an outer wall with an outer opening formed in the outer wall; a surrounding wall integrally joined to an outer periphery of the outer wall and extending substantially normal to the outer wall; an L-shaped barrier wall integrally joined to an inner periphery of the outer wall at an edge of the outer opening and extending substantially normal to the outer wall, the barrier wall forming an inner opening opposite the outer opening to meet the outlet box, a portion of the barrier wall extending toward the plane of the inner opening, the barrier wall further forming a cover conduit port; an attaching flange integrally joined to an inner end of the surrounding wall for being placed against the building wall, the attaching flange being a continuous flange about an exterior periphery of the surrounding wall; a display enclosure forming an interior and an enclosure conduit port; and a conduit having a conduit passage in communication between the cover conduit port and the enclosure conduit port; wherein the siding overlaps the attaching flange.

BRIEF DESCRIPTION OF THE DRAWINGS

FIG. 1 is a perspective view of an exterior building wall with a decorative light fixture mounted over the outlet box cover made in accordance with the present invention;

FIG. 2 is an enlarged perspective view of the assembly of FIG. 1, with the light fixture removed and with part of the exterior siding broken away, each for clarity of disclosure;

FIG. 3 is a sectional view as seen generally from line 3-3 in FIG. 2;

FIG. 4 is a sectional view of the outlet box cover made in accordance with the present invention as seen generally from line 3-3 in FIG. 2;

FIGS. 5-8 are back views of embodiments of outlet box covers made in accordance with the present invention;

FIG. 9 is a fragmentary perspective view of an outlet box cover made in accordance with the present invention with a trim ring;

FIG. 10 is an enlarged fragmentary sectional detail view taken substantially along the line II-II in FIG. 9;

FIG. 11 is a perspective view of a trim ring for an outlet box cover made in accordance with the present invention;

DETAILED DESCRIPTION OF THE INVENTION

Figure 12:
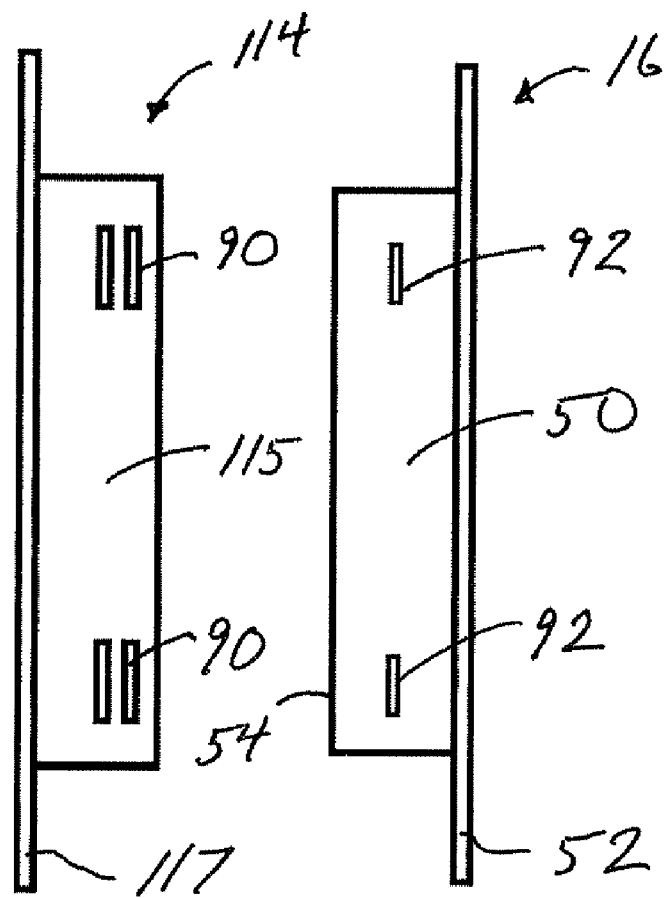
FIG. 12 is a side view of a trim ring and an outlet box cover made in accordance with the present invention.

FIGS. 1-4, in which like elements share like reference numbers, show various views of an outlet box cover made in accordance with the present invention. FIG. 1 illustrates a building wall 10 having exterior siding 12 and an electric light fixture 14 mounted on the wall 10 over an outlet box cover 16. The outlet box cover 16 overlies and hides an electric outlet box 18, (FIG. 3), in part underlies the adjacent siding 12, and also underlies the mounting flange 14a on the lighting fixture 14.

As is illustrated in FIG. 3, the wall 10 includes "two by four" studs or other structural elements (only one at 19 being shown) which run vertically and which are spaced apart horizontally. Exterior wall board 20 is secured, as by nails (only one at 22 being shown) or the like, to the outside of the spaced studs 19; interior wall panel 24 is secured, by nails (only one at 25 being shown) or the like, to the inside of the studs 19; and insulation 26 is located between the studs 19 and the exterior wall board 20 and interior wall panel 24.

The outlet box 18 generally includes opposed pairs of parallel walls 28 and 30 and a rear wall 32 forming a rigid structure with one front opening 35. Flanges 34 inturned from the forward edges of the walls 28 and/or 30 and having threaded taps to receive screws or bolts provide for the ready securement of an electric outlet and/or a cover plate (neither being shown) or the fixture flange 14a. The outlet box 18 itself is secured by a bracket 36 and nail 38 to the stud 19 in a manner so that the exterior flanges 34 are generally parallel to the wall board 20. Power is brought to the outlet box 18 via conductors 40 housed in a conduit or cable 41 secured by an elbow connector 42 to the box. In its mounted position, the outlet box 18 fits within a larger opening 44 in the exterior wall board 20 with a gap 45 around the outlet box 18. Those skilled in the art will appreciate that the profile of the outlet box 18 is not limited to the rectangular configuration described: the profile of the outlet box 18 can be rectangular, round, square, or any other profile desirable for a particular application.

The siding 12 typically includes separate elongated sheets or boards 12a-f, as illustrated in FIG. 1, which extend horizontally and are lapped over one another with the lower edge of each board overlapping the upper edge of the board immediately below it. This provides that water on the exterior face of the siding 12 runs down the wall and does not pass the innerfitting sheets or boards 12a-f into the wall 10.

The outlet box cover 16 can be formed as a single piece of plastic so that it is continuous across all corners. The outlet box cover 16 is designed to fit with an attaching flange 52 flush against the wall board 20 and under the siding 12, and encloses and covers the outlet box 18. This not only encloses the outlet box 18 and presents an attractive appearance, but also provides a flat exterior face against which the flange of the fixture can be secured. This establishes sound mechanical joints between the wall 10 and outlet box cover 16 and between the lighting fixture 14 and outlet box cover 16. The exterior face of the outlet box cover 16 can be provided with woodgrain impressions and/or in various colors for added beauty.

The outlet box cover 16 includes an outer wall 54 with an outer opening 62, a barrier wall 70 with an inner opening 72, a surrounding wall 50, and an attaching flange 52. The attaching flange 52 and the outer wall 54 are formed integrally with the surrounding wall 50 at its opposite ends, respectively, and each is disposed transversely to the surrounding wall 50. The surrounding wall 50 is continuous circumferentially, formed of two pairs of opposed wall sections 56 and 58 respectively interconnected at generally right-angled corners 59. Moreover, the attaching flange 52 extends radially outward from the surrounding wall 50 and is peripherally continuous about the surrounding wall 50. In one embodiment, the attaching flange 52 projects between one and two inches away from the surrounding wall 50. The outer wall 54 has an outer opening 62 formed therein which is designed to line up generally with the front opening 35 of the underlying outlet box 18. The barrier wall 70 extends from the outer wall 54 and surrounds the outer opening 62. The barrier wall 70 is substantially normal to the outer wall 54. In one embodiment, the height of the surrounding wall 50 and the barrier wall 70 are substantially equal, so that the barrier wall 70 extends from the outer wall 54 to the outlet box 18 when the front of the outlet box 18 is mounted flush with the wallboard 20. The barrier wall 70 provides an electrically isolated path for the wires passing through the outlet box cover 16 between the outlet box 18 and the electric light fixture 14. The barrier wall 70 also provides a compression member, bracing between the electric light fixture 14 and the outlet box 18 when the bolts connecting the electric light fixture 14 to the outlet box 18 are tightened down to secure the electric light fixture 14.

In use, the attaching flange 52 butts against the exterior face of the wall board 20 and nails 64 or the like used for securing the attaching flange 52 directly against the wall board 20. In this secured position, the outer opening 62 in the outer wall 54 lines up with the inner opening 72 of the barrier wall 70 and the front opening 35 of the outlet box 18. As secured in place, the outlet box cover 16 encloses and virtually hides the outlet box 18.

In one use of this invention, the siding sheets 12b-e overlap the attaching flange 52 and butt or almost butt against the surrounding wall 50. This directs water along the exterior face of the siding 12 past and over the exterior of the outlet box cover 16 to minimize water migration to behind the attaching flange 52. Also, since the attaching flange 52 is flush against the wallboard 20, this juncture can be adequately sealed by caulking and/or compression fit against the wallboard 20 to minimize leakage to the interior of the outlet box cover 16.

The particular interior dimension across the hollow within the surrounding wall 50 from the one wall section 56 to the opposite wall section 58 is of the order of 4 to 7 inches, for example. This allows for the outlet box cover 16 to be positioned over most conventionally sized electric outlet boxes 18 while yet providing clearance radially of the box to the surrounding wall 50. In one embodiment, the outer opening 62 in the outer wall 54 is rectangular in shape and is sized to correspond to the front opening 35 provided in the underlying outlet box 18. In another embodiment, the outer opening 62 in the outer wall 54 is round in shape and is sized to correspond to the front opening 35 provided in the underlying outlet box 18. The electric outlet box 18 can be mounted so that its front opening 35 is flush with the exterior of the wallboard 20, so that the barrier wall 70 butts or nearly butts against the exterior flanges 34 of the outlet box 18. The front opening 35 of the outlet box 18 and the inner opening 72 of the outlet box cover 16 line up. The light fixture flange 14a can be mounted directly flush against the outer wall 54 which in turn is strengthened by contact with the underlying outlet box 18 through the barrier wall 70. The lighting fixture 14 is secured to the outlet box 18 after the leads from the fixture are electrically connected by screw caps or the like to the conductors 40 in the outlet box 18.

The outlet box cover 16 can be formed by injection molding. It is possible to emboss the exterior face of the cover during injection molding with woodgrained impressions. This can be used to match the outlet box cover 16 with woodgrained siding. It is further possible to precolor the outlet box cover 16 by tinting the plastic before it is molded into the outlet box cover 16, allowing matching with the siding color and/or the lighting fixture color. For example, black might be a primary color of the outlet box cover 16 since many typical light fixtures 14 as illustrated are colored in a gloss black enamel; but other colors would of course be possible.

The plastic outlet box cover 16 forms an insulator enclosing the electric outlet box 18, protecting against shocks that might occur because of loose or defective wiring within the outlet box 18 and isolating sparks that can occur within the outlet box 18 and/or the barrier wall 70. The plastic outlet box cover 16 is also durable and does not scratch, dent or rust, and is maintenance free in use. As noted, the color selection can match the color of siding used, and further the woodgrain exterior can blend in with the typical woodgrain texture of the siding. The outlet box cover 16 also weatherizes the wall structure against air and/or water leakage as might be possible past the gap around the outlet box 18 and into the wall 10.

Those skilled in that art will appreciate that the outlet box cover 16 can be used with any electrical or non-electrical device that can be mounted to an electrical box. While a light fixture 14 has been illustrated as secured against the outlet box cover 16, it would be possible to install an electrical outlet (not shown) in the outlet box cover 16. Such an electrical outlet could be secured mechanically to the outlet box 18 by bolts passing through the outlet box cover 16 to the exterior flanges 34, and a closure plate could span and close the open outer opening 62 of the outlet box cover 16. With proper seals between the closure plate and the electrical outlet back and/or cover face 54, this butted connection would preclude leakage into the interior space within the outlet box cover 16. The electrical outlet receptacles could be covered with a hinged plate to keep them clean when not being used.

While the exemplary use of the outlet box cover 16 as described above is use in connection with a sided exterior wall, the outlet box cover 16 can be used to cover an electric outlet box 18 located in a wall that is not sided. Again, the outlet box cover 16 provides a durable watertight closure arrangement to minimize leakage into the wall structure and to minimize electrical shorts, any of which might be damaging and/or energy inefficient.

FIGS. 5-8, in which like elements share like reference numbers with FIGS. 1-4, are back views of embodiments of outlet box covers made in accordance with the present invention. The outlet box covers are suited for various front openings shapes in the outlet box. The views are looking from the attaching flange 52 toward the outer wall 54, i.e., from the outlet box toward the outlet box cover. Those skilled in the art will appreciate that the openings shapes described are exemplary and that other shapes can be used as desired.

FIGS. 5 and 6 shows electrical box covers 16 for use with an outlet box having a rectangular and a round front opening, respectively. The barrier wall 70 is the shape of the front opening of the outlet box so that the barrier wall 70 can butt against the outlet box and continue the electrical isolation of the electrical box through the electrical box cover 16.

FIG. 7 shows an electrical box cover 16 for use with an outlet box having either a rectangular or a round front opening. The barrier wall 70 includes a rectangular portion 74 and a round portion 76. When the electrical box cover 16 is used with an outlet box having a rectangular front opening, the rectangular portion 74 of the barrier wall 70 butts against the rectangular outlet box. When the electrical box cover 16 is used with an outlet box having a round front opening, the round portion 76 of the barrier wall 70 butts against the round outlet box. Thus, the electrical box cover 16 can be used for more than one shape of electrical box.

FIG. 8 shows an electrical box cover 16 having a removable opening panel 78. The removable opening panel 78 continues the plane of the outer wall 54 into the outer opening of the outer wall 54. The removable opening panel 78 can be trimmed out to a desired shape or removed completely at the installation site. In one embodiment, the removable opening panel 78 can be perforated with one or more patterns to allow easy removal to a particular shape. In another embodiment, the removable opening panel 78 can be the same thickness and uniformity as the outer wall 54, and the removable opening panel 78 can be cut to the desired opening with scissors, side cutters, a utility knife, or the like. In yet another embodiment, the removable opening panel 78 can form a cutting aperture 80 which provides an opening in the removable opening panel 78 to start the cut.

FIGS. 9-11, in which like elements share like reference numbers with each other and with FIGS. 1-4, show various views of an outlet box cover made in accordance with the present invention with an trim ring. The trim ring encircles the surrounding wall of the outlet box cover to provide an additional seal around the siding.

The trim ring 114 includes a ring wall 115 and ring extending flange 117 substantially normal to the ring wall 115. In one embodiment, the trim ring 114 is one-piece, continuous, and joint-free. The ring wall 115 closely engages the surrounding wall 50 of the outlet box cover 16 when the trim ring 114 is installed on the outlet box cover 16. The ring wall 115 and the ring extending flange 117 define a generally L-shaped channel 118 about the ring wall 115 for receiving and concealing siding edges 113 which are located adjacent to the outlet box outer wall 54. The ring extending flange 117 overlies the attaching flange 52. The trim ring 114 avoids the need to caulk around the siding edges 113 and provides ornamental concealment of the siding edges 113. Complementary ridges and grooves on the ring wall 115 and the surrounding wall 50 can be used to retain the ring wall 115 on the outlet box cover 16. The complementary ridges and grooves can extend continuously, partially, or locally around the ring wall 115 and the surrounding wall 50. In one embodiment, a linear ridge is provided on the surrounding wall 50 and one or more linear grooves are provided in the ring wall 115. Parallel spacing of the linear grooves allows the trim ring 114 to accommodate different thicknesses of siding 12, with the linear ridge residing in the linear groove appropriate to the thickness.

The trim ring 114 can be attached to the outlet box cover 16 before or after the siding 12 is installed. When the trim ring 114 is attached before the siding 12 is installed, the siding edges 113 can be slipped into the generally L-shaped channel 118 about the ring wall 115. When the trim ring 114 is attached after the siding 12 is installed, the ring wall 115 can be slipped between the siding edges 113 and the surrounding wall 50.

The trim ring 114 can be made of any suitable material, such as metal, plastic, or any other material as desired for a particular application. In one embodiment, the trim ring 114 is molded of a lightweight durable plastic, such as polypropylene or the like. In one embodiment, the trim ring 114 has a ring wall 115 and ring extending flange 117 of about 0.040 inches thickness, with the ring wall 115 of about ¾" straight width which is the same as the width of the surrounding wall 50, and with the ring extending flange 117 of about ⅝" width. Similarly, the trim ring 114 can be provided in various colors and finishes, such as wood grain finishes, as desired.

Those skilled in the art will appreciate that the trim ring is not limited to the exemplary L-shape cross section described above and can have other cross sections as desired. In another embodiment, the cross section can be U-shaped as described in U.S. Pat. No. 5,133,165 to Wimberly, incorporated herein in its entirety by reference. To form a U-shaped cross section, a second ring extending flange can be added to the trim ring of FIGS. 9-11 substantially normal to the ring wall and on an end of the ring wall opposite the first ring extending flange FIG. 12, in which like elements share like reference numbers with FIGS. 1-4 and 9-11, is a side view of a trim ring and an outlet box cover made in accordance with the present invention. The ring wall 115 and the surrounding wall 50 have complementary ridges and grooves to retain the trim ring 114 on the outlet box cover 16. In one embodiment, the ring wall 115 includes grooves 90 and the surrounding wall 50 includes ridges 92. The ridges 92 fit into the grooves 90 when the trim ring 114 is slid over the outlet box cover 16. The profile of the ridges 92 can be selected so that the ridges 92 spring the ring wall 115 away from the surrounding wall 50 until the ridges 92 fit into the grooves 90, thus locking the ridges 92 into the grooves 90. In one embodiment, the ridges 92 increase in height from the outer wall 54 toward the attaching flange 52 so that the tapered profile of the ridge 92 eases the groove 90 over the ridge 92 until the complementary ridge 92 and groove 90 lock in place. In another embodiment, the grooves 90 associated with a particular ridge 92 are spaced apart from each other so that the distance between the ring extending flange 117 and the attaching flange 52 are adapted for particular applications. For example, the grooves 90 can be spaced apart so that the distance between the ring extending flange 117 and the attaching flange 52 provides a first distance to fit insulated siding when a first groove is locked on the associated ridge and a second distance to fit uninsulated siding when a second groove is locked on the associated ridge. Those skilled in the art will appreciate that the grooves 90 associated with a particular ridge 92 can spaced apart from each other as desired for a particular application. A number of grooves can be associated with a particular ridge, with uniform or non-uniform spacing between adjacent grooves.

Figure 13:
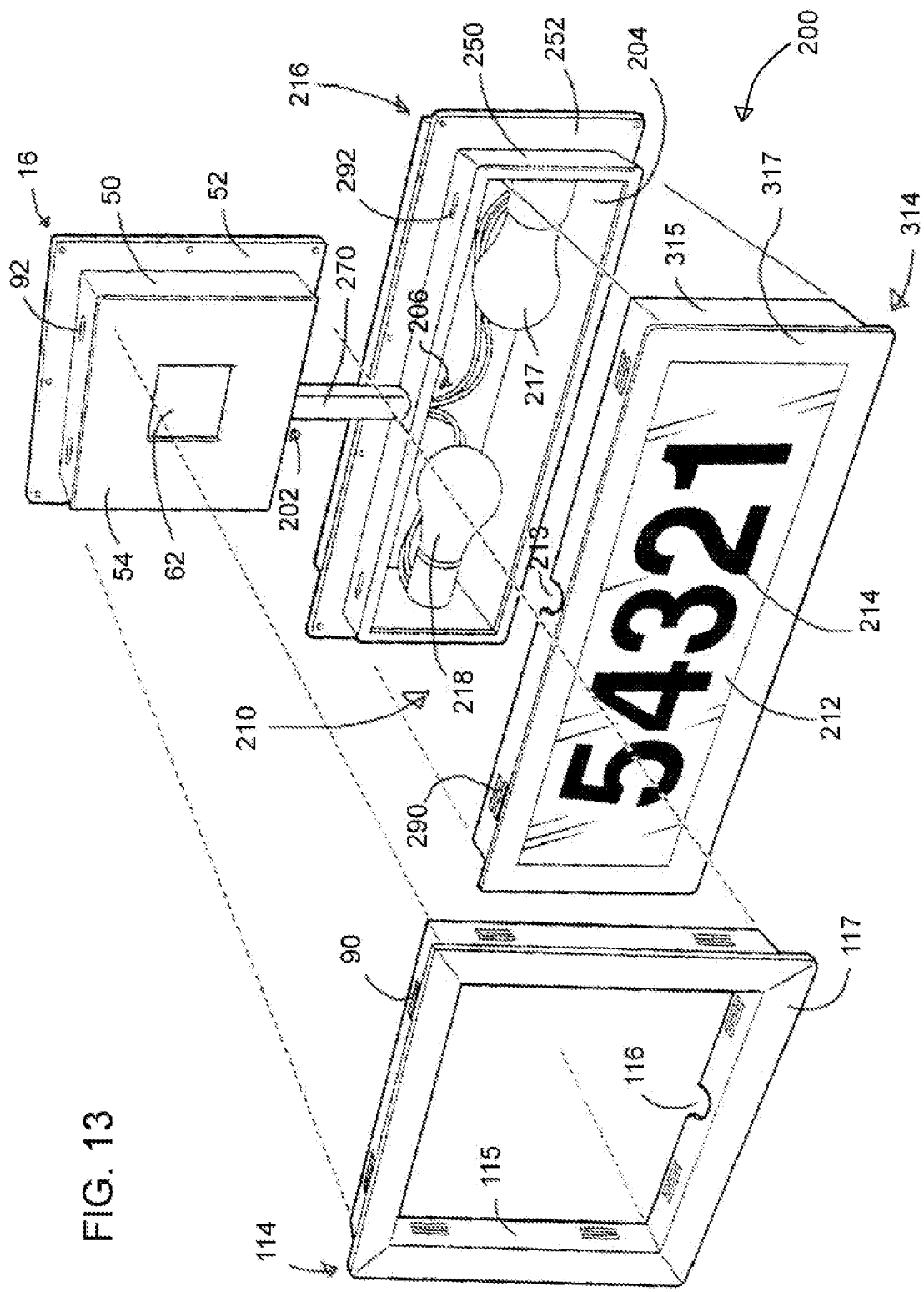
FIG. 13 is an exploded view of an outlet box cover with a display enclosure made in accordance with the present invention.

FIG. 13 is an exploded view of an outlet box cover with a display enclosure made in accordance with the present invention. In this embodiment, the outlet box cover is operably connected to a display enclosure with a conduit. The display enclosure can include a display for presenting normal and/or emergency information. The display enclosure can employ an attaching flange and trim ring arrangement as discussed above for the outlet box cover.

The display enclosure 200 includes a display box cover 216 and a display trim ring 314 joined to the outlet box cover 16 with a conduit 270. The trim ring 114 can include a conduit notch 116 in the ring wall 115 so the ring wall 115 can fit around the conduit 270. The barrier wall 50 of the outlet box cover 16 forms a cover conduit port 202 in communication with the interior of the outlet box cover 16. The display enclosure 200 forms an interior 204 and an enclosure conduit port 206. The conduit 270 has a conduit passage (not shown) in communication between the cover conduit port 202 and the enclosure conduit port 206. The conduit passage permits cables carrying power and/or information signals to pass between the outlet box cover 16 and the interior 204 of the display enclosure 200. A display can be disposed in the interior 204.

The display box cover 216 includes a display surrounding wall 250 and a display attaching flange 252. The display surrounding wall 250 defines the perimeter of the interior 204 of the display enclosure 200. The display attaching flange 252 extends radially outward from the display surrounding wall 250 and is peripherally continuous about the display surrounding wall 250. In one embodiment, the display attaching flange 252 projects between one and two inches away from the display surrounding wall 250.

The display trim ring 314 includes a ring wall 315 and display ring extending flange 317 substantially normal to the ring wall 315. In one embodiment, the display trim ring 314 is one-piece, continuous, and joint-free. The ring wall 315 closely engages the display surrounding wall 250 of the display box cover 216 when the display trim ring 314 is installed on the display box cover 216. The display trim ring 314 can include a conduit notch 213 in the ring wall 315 so the ring wall 315 can fit around the conduit 270. The ring wall 315 and the display ring extending flange 317 define a generally L-shaped channel 318 about the ring wall 315 for receiving and concealing siding edges which are located adjacent to the display box cover 216. The display ring extending flange 317 overlies the display attaching flange 252. The display trim ring 314 avoids the need to caulk around the siding edges and provides ornamental concealment of the siding edges. Siding can overlap the display attaching flange 252.

Complementary ridges and grooves on the ring wall 315 and the surrounding wall 50 can be used to retain the ring wall 315 on the display box cover 216. The complementary ridges and grooves can extend continuously, partially, or locally around the ring wall 315 and the display surrounding wall 250. In one example, a linear ridge 292 is provided on the display surrounding wall 250 and one or more linear grooves 290 are provided in the ring wall 315. Parallel spacing of the linear grooves allows the display trim ring 314 to accommodate different thicknesses of siding, with the linear ridge residing in the linear groove appropriate to the thickness. The grooves 290 associated with one of the ridges 292 can be spaced apart to provide a first distance between the display ring extending flange 317 and the display attaching flange 252 when a first groove 290 is locked on the one of the ridges 292 and a second distance between the display ring extending flange 317 and the display attaching flange 252 when a second groove 290 is locked on the one of the ridges 292.

The display 210 can be any display fitting within the interior 204 of the display enclosure 200. In the example of FIG. 13, the display 210 includes the light transmissible panel 212 mounted in the plane of the display ring extending flange 317, readable indicia 214 disposed on the transmissible panel 212, and a backlight lamp 217 disposed in the interior 204 internal to the transmissible panel 212. The display 210 can also include an emergency lamp 218 disposed in the interior 204 internal to the transmissible panel 212. In normal operation, the backlight lamp 217, such as a white lamp, lights the readable indicia 214 so that a name, house number, or the like, is visible. In emergency operation, the emergency lamp 218, such as a red lamp, lights. In one embodiment, the emergency lamp 218 flashes to draw further attention to the display 210. The emergency lamp 218 can illuminate in response to an emergency signal indicating a situation such as smoke, fire, flood, carbon monoxide, power outage, trespass, personal alert, or the like. The emergency signal can be provided by a smoke detector, fire detector, water detector, CO detector, power supply, intrusion detector, manual panic button, or the like as desired for a particular application. The constabulary or passersby seeing the illuminated emergency lamp 218 can then take action.

In another embodiment, the display 210 can be a light emitting diode (LED) display. In normal operation, the LED display presents readable indicia, such as a name, house number, or the like. In one embodiment, the readable indicia can be programmed in by the user. In another embodiment, the readable indicia is preprogrammed by the manufacturer. In emergency operation, the LED display is responsive to an emergency signal to present an emergency message indicating a situation such as smoke, fire, flood, carbon monoxide, power outage, trespass, personal alert, or the like. The emergency message can be displayed in response to an emergency signal indicating a situation such as smoke, fire, flood, carbon monoxide, power outage, trespass, personal alert, or the like. The emergency signal can be provided by a smoke detector, fire detector, water detector, CO detector, power supply, intrusion detector, manual panic button, or the like as desired for a particular application. The constabulary or passersby seeing the emergency message can then take action.

Figure 14:
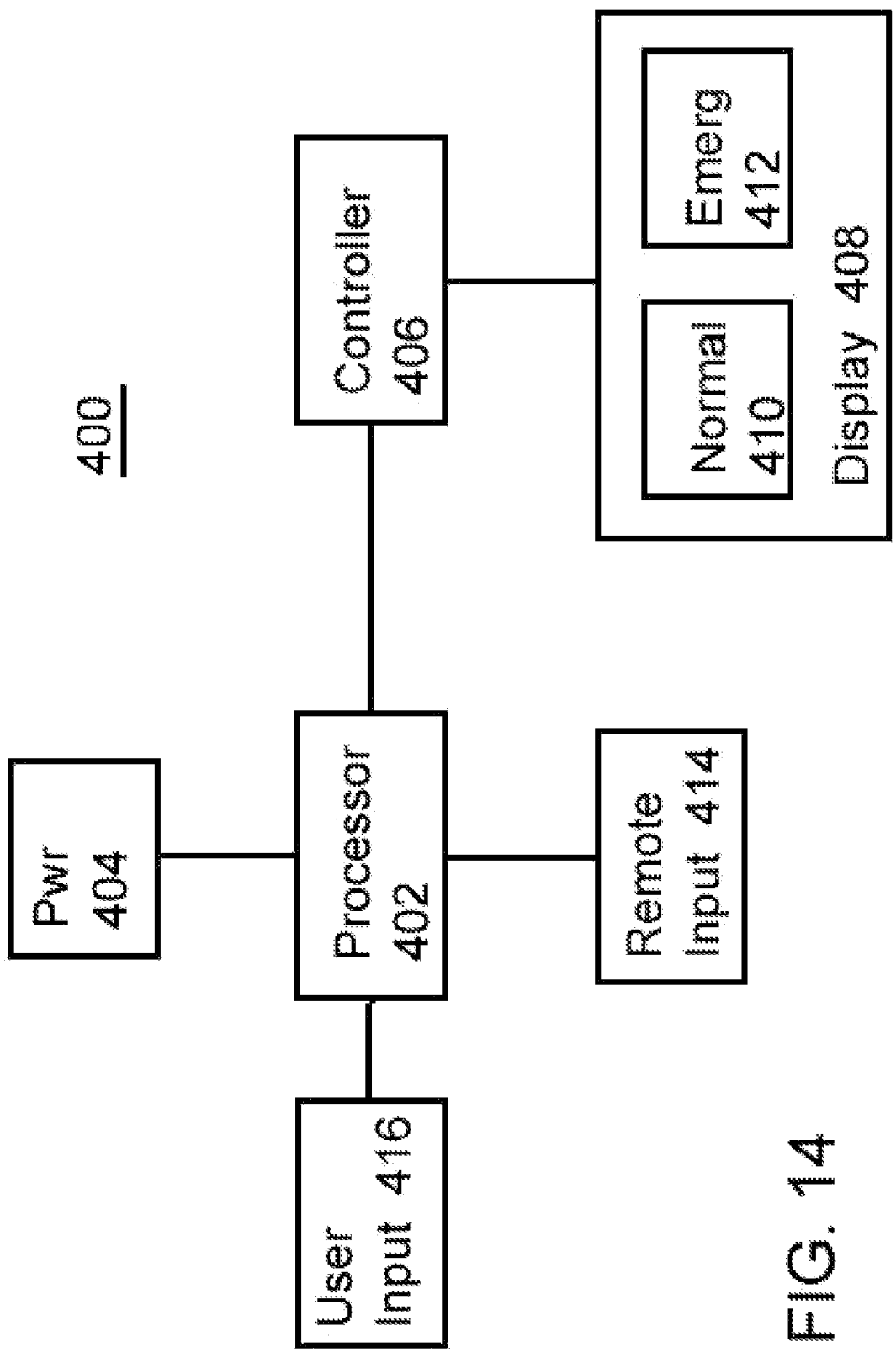
FIG. 14 is a block diagram of a display circuit for an outlet box cover with a display enclosure made in accordance with the present invention.

FIG. 14 is a block diagram of a display circuit for an outlet box cover with a display enclosure made in accordance with the present invention. The display circuit 400 receiving power 404 includes a processor 402, a lamp controller 406, a display 408, remote input 414, and optional user input 416. The processor 402, such as a microprocessor, directs operation of the lamp controller 406, which controls the display 408. The processor 402 can also include memory for storing various information and operating modes. The display 408 is operable to display normal information 410 and emergency information 412. The remote input 414 can be provided from devices such as smoke detectors, fire detectors, water detectors, CO detectors, power supplies, intrusion detectors, manual panic buttons, or the like as desired for a particular application. The remote input 414 can be provided to the processor 402 directly by wire or remotely by wireless connections. In one embodiment, an emergency signal from the remote input 414 can trigger the display of particular emergency information 412 on the display 408. For example, when the remote input 414 indicates a fire, the display 408 can show the message "FIRE!!! CALL THE FIRE DEPARTMENT!!!." The optional user input 416 can allow the user to select operating modes, to select preprogrammed messages, and to program custom user messages.

While the embodiments of the invention disclosed herein are presently considered to be preferred, various changes and modifications can be made without departing from the scope of the invention. Those skilled in the art will appreciate that the embodiments described are exemplary and that alternative circuits can be used as desired for particular applications. The scope of the invention is indicated in the appended claims, and all changes that come within the meaning and range of equivalents are intended to be embraced therein.

I claim:

1. A cover for an outlet box mounted in a building wall, comprising:
    an outer wall with an outer opening formed in the outer wall;
    a surrounding wall integrally joined to an outer periphery of the outer wall and extending substantially normal to the outer wall;
    an L-shaped barrier wall integrally joined to an inner periphery of the outer wall at an edge of the outer opening and extending substantially normal to the outer wall, the barrier wall forming an inner opening opposite the outer opening to meet the outlet box, a portion of the barrier wall extending toward the plane of the inner opening, the barrier wall further forming a cover conduit port;
    an attaching flange integrally joined to an inner end of the surrounding wall for being placed against the building wall, the attaching flange being a continuous flange about an exterior periphery of the surrounding wall;
    a display enclosure forming an interior and an enclosure conduit port; and
    a conduit having a conduit passage in communication between the cover conduit port and the enclosure conduit port.

2. The cover of claim 1 further comprising a display disposed in the interior.

3. The cover of claim 2 wherein the display comprises a light transmissible panel, readable indicia disposed on the transmissible panel, and a backlight lamp disposed in the interior internal to the transmissible panel.

4. The cover of claim 3 further comprising an emergency lamp disposed in the interior internal to the transmissible panel.

5. The cover of claim 4 wherein the emergency lamp illuminates in response to a situation selected from the group consisting of smoke, fire, flood, carbon monoxide, power outage, trespass, and personal alert.

6. The cover of claim 2 wherein the display comprises a light emitting diode (LED) display.

7. The cover of claim 6 wherein the light emitting diode (LED) display is programmable by a user.

8. The cover of claim 6 wherein the light emitting diode (LED) display is responsive to an emergency signal to display an emergency message.

9. The cover of claim 8 wherein the emergency signal indicates a situation selected from the group consisting of smoke, fire, flood, carbon monoxide, power outage, trespass, and personal alert.

10. The cover of claim 1 wherein the display enclosure comprises:
    a display box cover having a display surrounding wall and a display attaching flange extending radially outward from the display surrounding wall; and
    a display trim ring having a display ring wall and display ring extending flange substantially normal to the display ring wall;
    wherein the display ring wall is slidable about the display surrounding wall.

11. The cover of claim 10 wherein the display ring wall and the display surrounding wall have complementary ridges and grooves, the grooves associated with one of the ridges are spaced apart to provide a first distance between the display ring extending flange and the display attaching flange when a first groove is locked on the one of the ridges and a second distance between the display ring extending flange and the display attaching flange when a second groove is locked on the one of the ridges.

* * * * *